United States Patent
Jensen et al.

(10) Patent No.: US 11,413,575 B2
(45) Date of Patent: Aug. 16, 2022

(54) METHOD AND APPARATUS FOR REDUCTION OF HCl EMISSION FROM CEMENT PLANTS USING CEMENT RAW MEAL AS ABSORBER

(71) Applicant: FLSmidth A/S, Valby (DK)

(72) Inventors: Lars Skaarup Jensen, Vallensbæk (DK); Stylianos Pachitsas, Copenhagen (DK)

(73) Assignee: FLSmidth A/S

( * ) Notice: Subject to any disclaimer, the term of this patent is extended or adjusted under 35 U.S.C. 154(b) by 0 days.

(21) Appl. No.: 17/272,613

(22) PCT Filed: Aug. 29, 2019

(86) PCT No.: PCT/IB2019/057299
§ 371 (c)(1),
(2) Date: Mar. 1, 2021

(87) PCT Pub. No.: WO2020/044288
PCT Pub. Date: Mar. 5, 2020

(65) Prior Publication Data
US 2021/0339192 A1    Nov. 4, 2021

(30) Foreign Application Priority Data

Aug. 29, 2018 (DK) .......................... PA 2018 70552

(51) Int. Cl.
*B01D 51/10* (2006.01)
*B01D 53/10* (2006.01)
(Continued)

(52) U.S. Cl.
CPC .......... *B01D 53/685* (2013.01); *B01D 51/10* (2013.01); *B01D 53/10* (2013.01); *B01D 53/83* (2013.01);
(Continued)

(58) Field of Classification Search
CPC ......... C04B 7/364; C04B 7/365; C04B 11/26; C04B 7/436; C04B 18/162; B01D 53/685;
(Continued)

(56) References Cited

U.S. PATENT DOCUMENTS

2005/0031515 A1* 2/2005 Charette ................ B01D 53/83
                                                        423/244.07
2017/0354914 A1* 12/2017 Riess ...................... C04B 7/365

FOREIGN PATENT DOCUMENTS

DE         3643143 A1    5/1988
EP         1905748 A1    4/2008
(Continued)

OTHER PUBLICATIONS

International Search Report and Written Opinion (dated Jan. 8, 2020).

*Primary Examiner* — Timothy C Vanoy
(74) *Attorney, Agent, or Firm* — Jeffrey A. Sharp

(57) ABSTRACT

The invention relates to a method for reduction of HCl emission from a cement plant based on a treatment of a preheater (1) and/or bypass gas stream, characterized in that a cement raw meal, as a HCl absorber, is dispersed in the gas stream(s) from which HCl is to be removed; the cement raw meal is introduced from a raw mill (6) and/or a silo (8) into a pipe with a up going gas flow; the pipe being arranged in fluid communication at a point after a gas conditioning tower (7) and/or before a particle filter unit (5) and/or in a by-pass line before particle filter (4).

9 Claims, 6 Drawing Sheets

(51) Int. Cl.
  *B01D 53/68* (2006.01)
  *B01D 53/83* (2006.01)
  *C04B 7/36* (2006.01)

(52) U.S. Cl.
  CPC ........ *C04B 7/364* (2013.01); *B01D 2251/404* (2013.01); *B01D 2257/2045* (2013.01)

(58) Field of Classification Search
  CPC ................ B01D 53/81; B01D 2251/00; B01D 2251/502; B01D 2257/2045; B01D 2258/0233
  See application file for complete search history.

(56) References Cited

FOREIGN PATENT DOCUMENTS

| | | | | |
|---|---|---|---|---|
| EP | 3115345 | A1 | 1/2017 | |
| KR | 2013 0 096 227 | * | 8/2013 | ............... C04B 7/60 |
| WO | 2013/075719 | A1 | 5/2013 | |

\* cited by examiner

Table 1

|  | T (°C) | H$_2$O effect factor on raw meal HCl absorption capacity 5%vol.→15%vol. | Raw meal injection rate (t/h) | $\frac{Raw\ meal\ injected}{Raw\ mill\ feed^*} \cdot (\%)$ |
|---|---|---|---|---|
| Expected | 144 | 2.18 | 22.8 | 7.1 |
| Optimal extreme | 147 | 6 | 8.3 | 2.6 |
| Non-Optimal extreme | 137 | 1 | 49.9 | 15.5 |

Fig. 6

Table 2

|  | T (°C) | H$_2$O effect factor on raw meal HCl absorption capacity 5%vol.→15%vol. | Raw meal injection rate (t/h) | $\frac{Raw\ meal\ injected}{Raw\ mill\ feed^*} \cdot (\%)$ |
|---|---|---|---|---|
| Expected | 144 | 2.18 | 3.4 | 1.1 |
| Optimal extreme | 148 | 6 | 1.2 | 0.4 |
| Non-Optimal extreme | 137 | 1 | 7.5 | 2.3 |

Fig. 7

METHOD AND APPARATUS FOR REDUCTION OF HCl EMISSION FROM CEMENT PLANTS USING CEMENT RAW MEAL AS ABSORBER

FIELD OF THE INVENTION

This invention relates to a method and apparatus for reduction of HCl emissions from cement plants.

BACKGROUND OF THE INVENTION

Cement manufacturing is a highly energy consuming and emission producing process. This is a consequence of the extreme heat generated in the cement kiln, required to produce cement clinkers. Given its high emissions and importance to society, cement plant is an obvious place to reduce emissions. Cement plants releases greenhouse gas emissions both directly and indirectly. Heating of limestone releases $CO_2$ directly and the burning of fossil fuels to heat the kiln indirectly results in $CO_2$ emissions.

Another gaseous pollutant of concern in the cement industry is Hydrogen chloride (HCl), which also must be kept within specified limits. The HCl origin and release mechanisms in cement manufacturing process are however not fully understood. Yet, industrial measurements disclose the presence of two formation zones: the cement kiln and the upper cyclones of the raw meal preheater tower. Furthermore, HCl scrubbing phenomena are observed in the raw mill and particle filter units.

There is a significant number of cement plants that are challenged in complying with the HCl emission limits (E.U.: 10 mg/Nm3, 10% vol O2, dry). The existing HCl emission control methods are based on:
(i) the empirical utilization of raw mill scrubbing effect
(ii) Ca(OH)2 injection in flue gas streams, preheater raw meal feed and gas conditioning tower, and
(iii) acid gases scrubber installations, e.g., wet scrubbers and gas suspension absorber semi-dry scrubbers (lime slurry spraying).

Typically, the most widely used method for the control of HCl emission is the flue gas passing through the raw mill when it is in operation. However, this method has some significant limitations that are related to raw mill sizes (a fraction of flue gas can be treated) and limited raw mill operating time.

Therefore, it would also be advantageous to be able to apply a method for reduction of HCl emissions from cement plants, preferably when the raw mill is not in operation, and in order to comply with the HCl emission limits.

It will be clearly understood that any reference herein to background material or information, does not constitute an admission that any material, information, forms part of the common general knowledge in the art, or is otherwise admissible prior art.

OBJECT OF THE INVENTION

It is an object of the present invention to overcome or at least alleviate one or more of the above problems of the prior art and/or provide the consumer with a useful or commercial choice.

It is an object of the present invention to provide a method for reduction of HCl emissions from cement plants, preferably when the raw mill is not in operation.

It is another object of the present invention to provide a method for reduction of HCl emissions from cement plants in order to comply with the HCl emission limits.

It is another object of the present invention to provide a low cost-complexity ancillary method for the control of HCl emission from cement plants which utilizes the HCl absorption capacity of raw meal at relative low temperatures (<180° C.) in presence of moisture in gas phase.

It is a further object of the present invention to provide an alternative to the prior art.

SUMMARY OF THE INVENTION

In a first aspect, the invention relates to a method for reduction of HCl emission from a cement plant based on a treatment of a preheater and/or bypass gas stream, characterized in that a cement raw meal, as a HCl absorber, may be dispersed in the gas stream(s) from which HCl is to be removed. The cement raw meal may be introduced from a raw mill and/or a silo into a pipe with a preferably up going gas flow. The pipe may have a vertical up going gas flow. The pipe may be arranged in fluid communication at a point after a gas conditioning tower and/or before a particle filter unit and/or in a by-pass line before particle filter. The vertical up going gas flow makes the agglomeration of particles difficult (particles' agglomeration decreases the apparent HCl absorption capacity of raw meal).

The basic technological advantage of the method according to the present invention, rises from the experimental observed unique HCl absorption mechanism of raw meal at low temperatures (<200° C.). In particular, the method according to the present invention utilizes the experimental proven initial fast HCl absorption mechanism by raw meal, which corresponds to a surface saturation phenomenon. Therefore, the raw meal utilization as an absorbent gives a low-cost alternative to the conventional scrubbing technologies, e.g., Ca(OH)2 injection.

The reduction of HCl emission may be applicable when said raw mill is not in operation.

In an exemplary embodiment of the invention, an operating temperature of the raw meal as a sorbent may be maintained in a level below 180° C., preferably close to 100° C. and most preferably less than 100° C.

Conducted experimental activities in the temperature range 100-450° C. using dry/moist gas phase showed that raw meal can be used as HCl absorbent at temperatures below 180° C. and preferably below 100° C. Furthermore, it was detected that HCl absorption capacity of raw meal increases with water content of gas phase and moisture content of raw meal. Additionally, it is significant that the effect of moist gas phase is pronounced with temperature decrease. Therefore, the method's operating temperature is significant lower than the conventional scrubbing technologies.

In another exemplary embodiment of the invention, the method may applicable for a total flue gas stream or at least a fraction of it. This enables a possibility for a subsequent mixing with a part of high temperature gas stream to ensure that the filter temperature is high enough to avoid surface corrosion due to condensation.

In an exemplary embodiment of the invention, a gas phase moisture content may be maintained above 5% vol., preferably close to 20% vol. and more preferably above 20% vol.

The injected raw meal may be a dispersible solid powder.

A moisture content in the solid powder may be elevated before injection.

The injected raw meal may be recollected and used as feed to the preheater.

In another exemplary embodiment of the invention, the method may be used to absorb SO2 and/or NH3 and/or Hg.

In a second aspect, the invention relates to an apparatus, which may utilize any of the methods mentioned above. The apparatus may comprise a reactor pipe, wherein the raw meal is preferably injected into up going gas flow. The apparatus may further comprise a separator (cyclone) for the discharging of the injected raw meal. The apparatus may also comprise a fan for the stabilization of flue gas flow.

The first and second aspects of the present invention may be combined.

The present invention illustrates some examples of an industrial utilization of the method, which comprises a simple configuration. Therefore, the suggested apparatus, which utilizes the method according to the present invention, gives a solution for HCl emission control that is characterized by low installation and maintenance costs. The industrial appliance of the method according to the present invention, is characterized by significantly lower capital and maintenance expenses in comparison with the potential HCl scrubber installation. Furthermore, the suggested apparatus requires only a light modification of cement plants layout which corresponds to a low capital investment.

In the present context a number of terms are used in a manner being ordinary to the skilled person. Some of these terms are detailed below:

Vol. —is preferably used to mean/denote volume per volume concentration.

BRIEF DESCRIPTION OF THE FIGURES

The figures show one way of implementing the present invention and is not to be construed as being limiting to other possible embodiments falling within the scope of the attached claim set.

Embodiments of the invention, by way of example only, will be described with reference to the accompanying figures in which:

FIG. 6 illustrates a table (Table 1) containing indicative values for case study 1, considering nominal flue gas HCl content: 100 ppm and raw mill operating feed 321t/h.

FIG. 7 illustrates a table (Table 2) containing indicative values for bypass-case study 2, considering nominal flue gas HCl content: 100 ppm and raw mill operating feed 321 t/h.

DETAILED DESCRIPTION OF THE INVENTION

Figure 1:
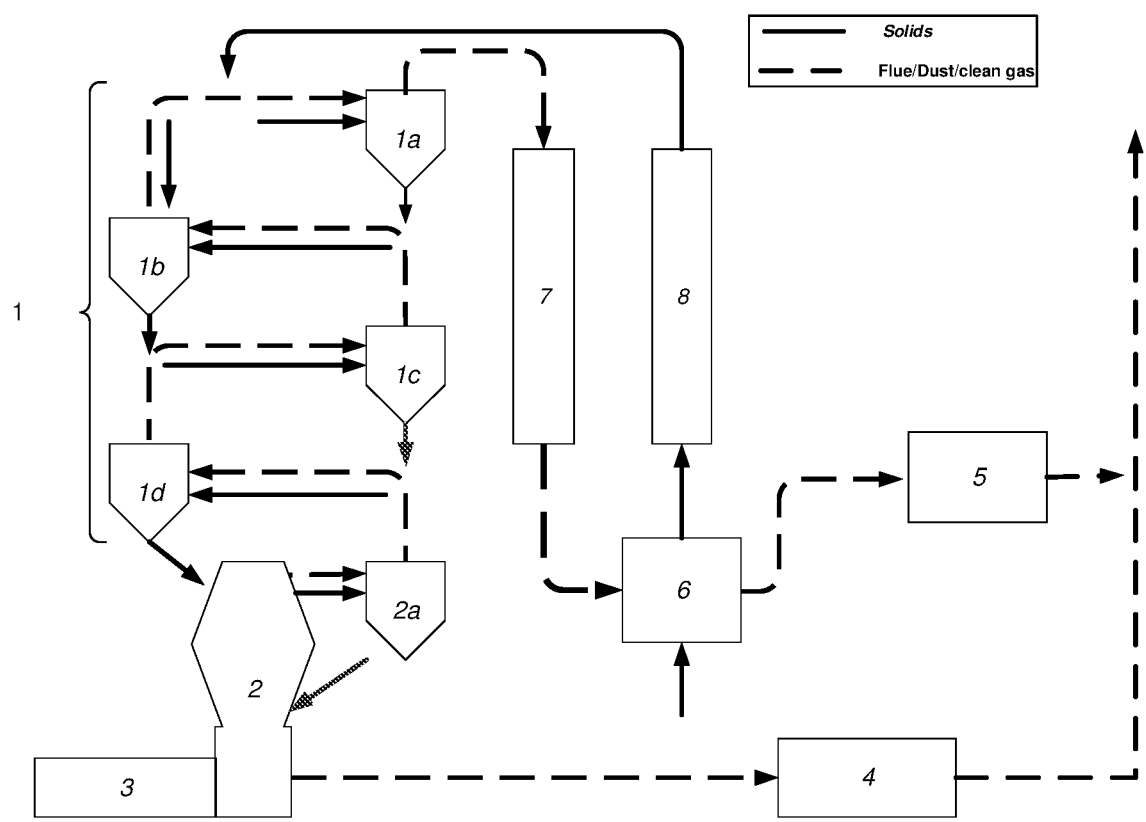
FIG. 1 schematically illustrates a simplified cement plant layout.

FIG. 1 illustrates a simplified cement plant layout that comprises a four-stage cement preheater 1, calciner 2, rotary kiln 3, by-pass particle filter unit 4, main particle filter unit 5, raw mill 6, gas conditioning tower 7 and raw meal storage silo 8. The present invention relates to a method for reduction of HCl emission from a cement plant (as illustrated in FIG. 1 for example) based on a treatment of the preheater 1 and/or bypass gas streams. Cement raw meal, which is grinded raw material from the raw mill, act as an HCl absorber and is dispersed in the gas stream(s) from which HCl is to be removed. The cement raw meal is introduced from the raw mill 6 and/or the silo 8 into a pipe with a vertical up going gas flow. The pipe is preferably arranged in fluid communication at a point after the gas conditioning tower 7 and/or before the particle filter unit 5 and/or in the by-pass line before particle filter 4. The method is applicable when the raw mill 6 is not in operation. However, in another embodiment, the method can also be used when the raw mill is in operation. In this embodiment, the apparatus is arranged in the kiln bypass line or in the case that a fraction of preheater gas stream bypasses the raw mill.

The utilization of the available cement raw meal (abundant) as HCl absorber has significantly lower operating expenses in comparison with the conventional HCl scrubbing methods which utilize specialized absorbers, e.g., Ca(OH)2.

The operating temperature of the raw meal, as a sorbent, is maintained in a level below 180° C., preferably close to 100° C. and most preferably less than 100° C.

The method is applicable for a total flue gas stream or at least a fraction of it.

The gas phase moisture content is maintained above 5% vol., preferably close to 20% vol. and more preferably above 20% vol. The injected raw meal is a dispersible solid powder and a moisture content in the solid powder is elevated before injection.

In another embodiment of the present invention, the injected raw meal can be recollected and used as feed to the preheater 1.

The method according to the present invention may also be used to absorb SO2 and/or NH3 and/or Hg.

The method according to the present invention gives a low cost-complexity ancillary method for the control of HCl emission from cement plants which utilizes the HCl absorption capacity of raw meal at relative low temperatures (<180° C.) in presence of moisture in gas phase. The invention is based on findings of experiments, which show that raw meal can rapidly absorb HCl up to a certain capacity and reveal the optimal operating conditions.

The experimental results showed that the HCl absorption is a very fast reaction (almost instantaneous) corresponding to a surface saturation phenomenon. The presence of agglomerates decreases the apparent HCl absorption capacity of raw meal. In practice, the reaction is one stage (fast reaction stage) at ideal conditions. The presence of agglomerates makes it to appear as a two stage-reaction characterized by an initial fast reaction stage and a second slow reaction stage.

The fast reaction of the dispersed particles of raw meal with HCl is utilized by the method according to the present invention, for the reduction of flue gas HCl content. Furthermore, the experimental investigation showed that the raw meals' reactivity with HCl is strongly related to temperature moisture content of raw meal, and gas phase water content. In particular, the HCl absorption capacity of raw meal increases as the temperature is lowered below 180° C. at a given moisture content of gas phase. Additionally, the HCl absorption capacity of raw meal increases with the moisture content of gas phase as the temperature approaches 100° C. or less. Another important observation was that the HCl absorption capacity of raw meal decreases due the presence of raw meal particle agglomerates; consequently, the injection of dispersible raw meal is considered preferable in comparison with raw meal slurry.

Figure 2:
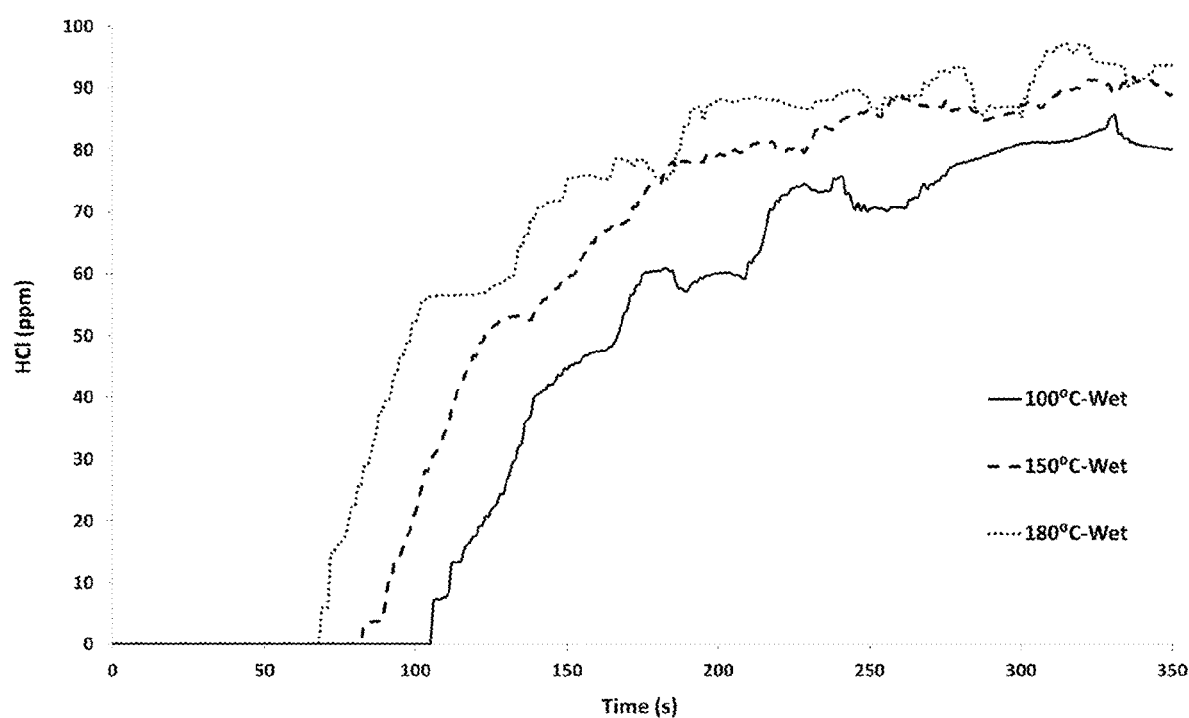
FIG. 2 schematically illustrates experimental results of a HCl absorption by cement raw meal as function of temperature using moist gas phase (5% vol. H2O).

FIG. 2 shows experimental results, which illustrates the temperature effect on HCl absorption by fast reaction (surface saturation) in the case of moist gas phase. In particular, the experimental data showed the presence of an initial period of fast absorption (68-106s) which is extended when temperature is decreased (in the range 180° C.-100° C.). This elongation corresponds to an increase in HCl absorption capacity as the temperature is decreased.

Figure 3:
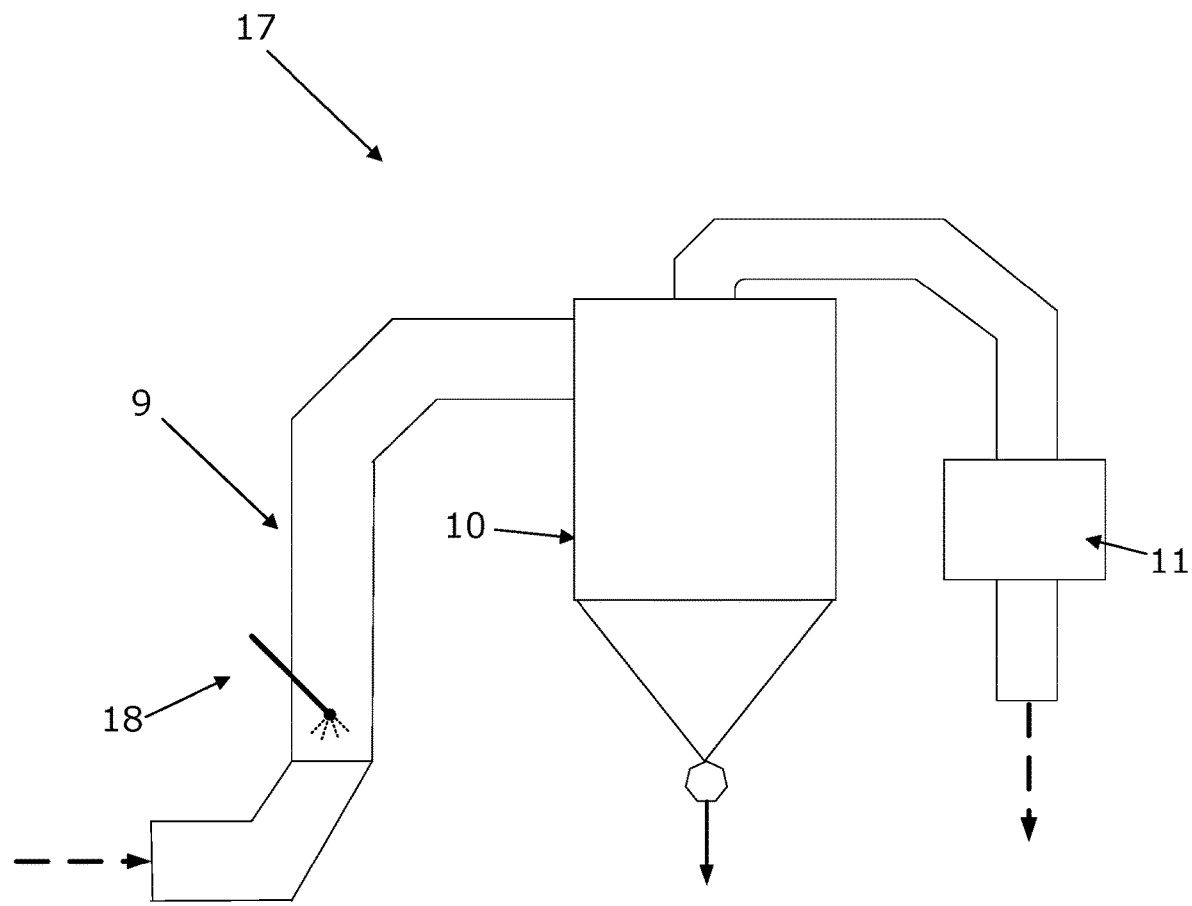
FIG. 3 schematically illustrates an apparatus, for carrying out the method according to the present invention.

The industrial appliance of the suggested method according to the invention, derives its benefits from using the inherent HCl capturing capability of raw meal and uses temperature and moisture content control to optimize its performance. FIG. 3 schematically illustrates a suggested industrial apparatus for carrying out the method according to the present invention. In the illustrative example in FIG. 3, the apparatus 17 comprises:
- a reactor pipe 9, wherein the raw meal is preferably injected into up going gas flow through the injection point for raw meal 18; the upward flue gas stream characterized by reaction optimal conditions (temperature, moisture and solids-gas phase contact time)
- a separator (cyclone) 10 for the discharging of the injected raw meal, and where the flue gas is stripped from particles, and
- a fan 11 for the stabilization of the flue gas flow.

The raw meal, which is injected trough the injection point for raw meal 18, is taken from the raw mill 6 and/or the silo 8. In another embodiment of the present invention, where the optimal reaction conditions are combined with low flue gas HCl content (significantly less than 100 ppm) the separator 10 installation is considered optional. The apparatus outlet stream can go directly to the particle filter unit (not shown in FIG. 3) considering its low dust load, and the appropriate temperature and moisture content.

Figure 4:
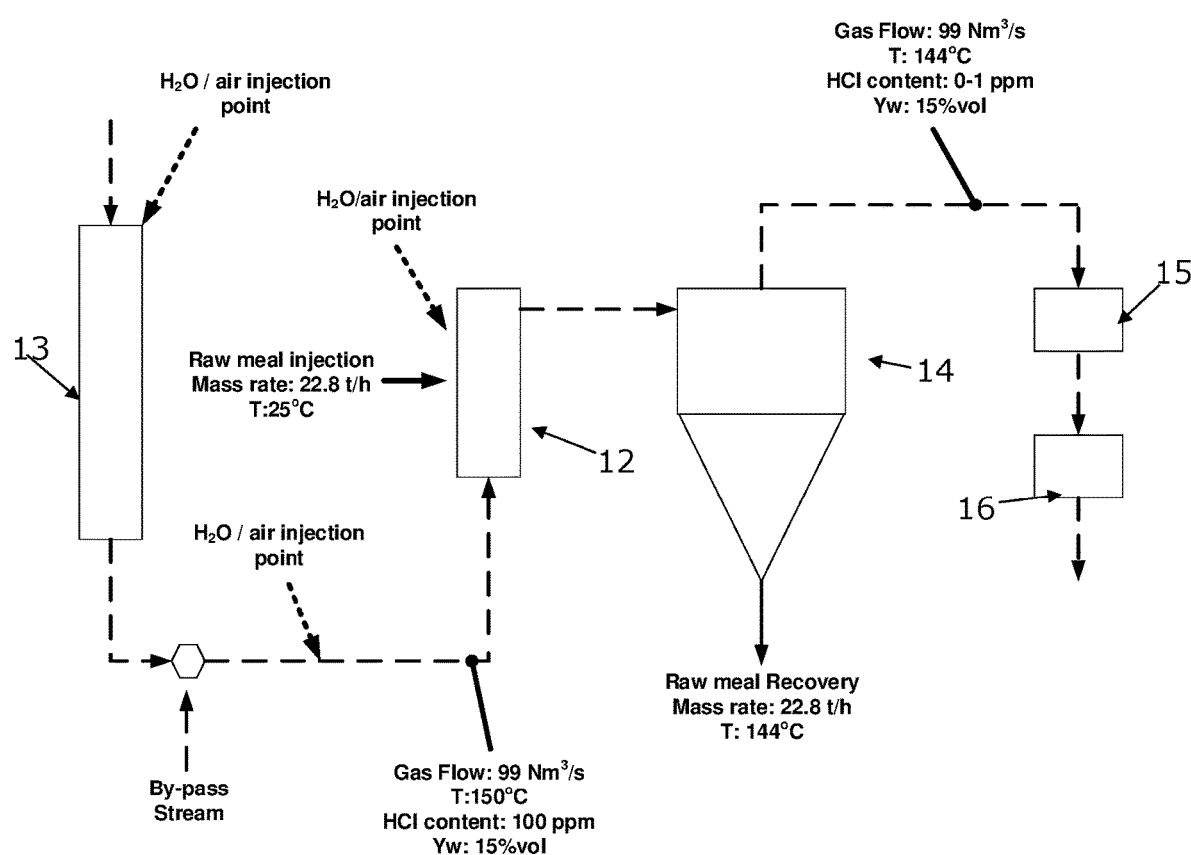
FIG. 4 schematically illustrates a setup for the apparatus, for carrying out the method according to the present invention, when the raw mill is off (case study 1).
Figure 5:
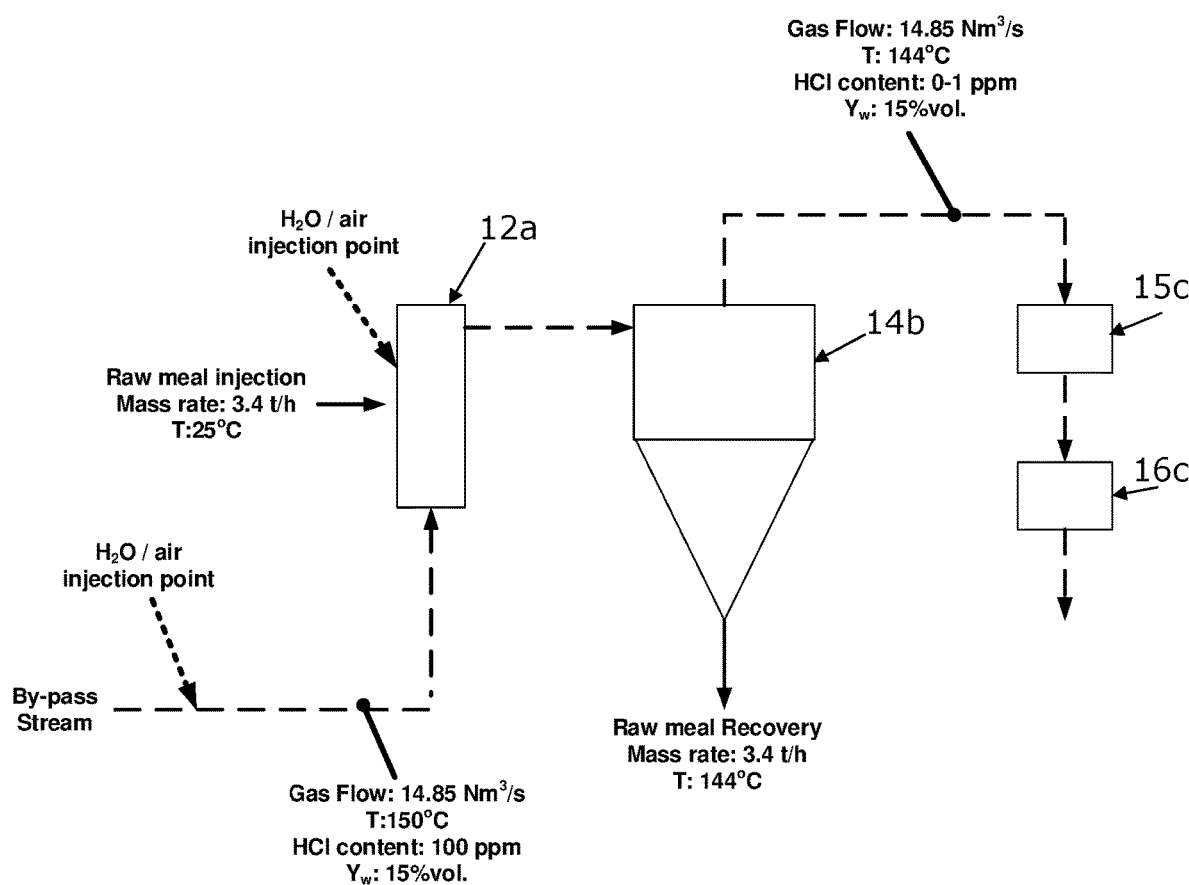
FIG. 5 schematically illustrates an alternative setup for the apparatus, for carrying out the method according to the present invention (case study 2).

In FIGS. 4 and 5, different embodiments of the apparatus are presented. In particular, the suggested appliance comprises:
(i) appliance of the suggested apparatus/method for reduction of HCl emission when raw mill is not in operation—case study 1, and
(ii) appliance of the suggested apparatus method for reduction of by-pass stream HCl content-case study 2.

FIG. 4 illustrates an embodiment of the apparatus in the case that raw mill is not in operation-case study 1. In particular, the flue gas streams from gas conditioning tower 13 and by-pass go to reactor pipe 12 where the raw meal injection and flue gas de-chlorination occur. The separation of raw meal from flue gas takes place in the apparatus cyclone 14. The injected raw meal is recollected and flue gas with low dust load goes to particles filter unit 16 assisted by the apparatus fan 15. Furthermore, a number of potential of H2O/air injection points for flue gas conditioning control (temperature–moisture content) are presented.

The illustrated embodiment in FIG. 4 corresponds to the anticipated system behavior. However, two extreme cases (optimal and non-optimal) are presented in Table 1 illustrated in FIG. 6. The extreme scenarios are used due to the limited availability of experimental data about the H2O effect on HCl absorption capacity of raw meal for gas moisture content above 5% vol. In particular, Table 1 presents the appliance using:
(i) the anticipated behavior (conservative approach) that considers linear relation between moisture content of flue gas and HCl absorption capacity of raw meal,
(ii) the optimal extreme that considers an exponential relation between moisture content of flue gas and HCl absorption capacity of raw meal, and
(iii) the non-optimal extreme that considers no effect of moisture content of flue gas on HCl absorption capacity of raw meal for moisture content of flue gas above 5% vol.

Generally, case study 1 demonstrates that the experimentally determined HCl absorption capacity of meal is sufficient to reduce the HCl concentration in the gas by 100 ppm with the available raw meal flows at typical industrial conditions.

FIG. 5 schematically illustrates the appliance of the suggest apparatus/method in the reduction of by-pass stream HCl content (case study-2). In particular, the by-pass gas stream goes to reactor pipe 12a where the raw meal injection and flue gas de-chlorination occur. The separation of raw meal from flue gas takes place in apparatus cyclone 14b. The injected raw meal is recollected and flue gas with low dust load goes to particles filter unit 16c assisted by the apparatus fan 15c. A fundamental pre-requirement is the by-pass stream quenching before the HCl scrubbing apparatus, which uses injection of air/H2O.

The presented embodiment of the apparatus in FIG. 5 corresponds to the anticipated system behavior. However, two extreme cases (optimal and non-optimal) are presented in Table 2. The extreme scenarios are used due to the limited experimental data about the H2O effect on HCl absorption capacity of raw meal for gas moisture content above 5% vol. In particular, the performance of the method is presented using:
(i) the expected behavior (conservative approach) that considers linear relation between moisture content of flue gas and HCl absorption capacity of raw meal,
(ii) the optimal extreme that considers an exponential relation between moisture content of flue gas and HCl absorption capacity of raw meal, and
(iii) the non-optimal extreme that considers no effect of moisture content of flue gas on HCl absorption capacity of raw meal for moisture content of flue gas above 5% vol.

The studied scenarios showed that in the case that the optimal reaction conditions are combined with low flue gas HCl content (significantly lower than 100 ppm) the separator-cyclone 10 installation is optional.

Although the present invention has been described in connection with the specified embodiments, it should not be construed as being in any way limited to the presented examples. It should also be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF REFERENCES

1: Preheater
1a, 1b, 1c, 1d: cyclones
2: Calciner
2a: cyclone
3: Rotary kiln
4: By-pass particle filter unit
5: Main particle filter unit
6: Raw mill 7: Gas conditioning tower
8: Raw meal storage silo
9: Reactor pipe
10: Separator-cyclone
11: Fan
12: Reactor pipe
12*a*: Reactor pipe
13: Gas conditioning tower
14: Cyclone
14*b*: Cyclone
15: Fan
15*c*: Fan
16: Particle filter
16*c*: Particle filter
17: Apparatus
18: Injection point for raw meal

The invention claimed is:

1. A method for reduction of HCl emission from a gas stream of a cement plant, comprising: dispersing a cement raw meal into said gas stream as an HCL absorber, said cement raw meal being introduced from a raw mill and/or a silo into a pipe with an up going gas flow, said pipe being arranged in fluid communication at a point selected from one of the group consisting of: after a gas conditioning tower; before a particle filter unit; in a by-pass line before a particle filter; a combination thereof, wherein an operating temperature of said raw meal as a sorbent is maintained in a level below 180° C.

2. The method according to claim 1, wherein said pipe has a vertical up going gas flow.

3. The method according to claim 1, wherein said reduction of HCl emission is applicable when said raw mill is not in operation.

4. The method according to claim 1, wherein the method is applicable for a total flue gas stream or at least a fraction of said total flue gas stream.

5. The method according to claim 1, wherein a gas phase moisture content is maintained above 5% vol.

6. The method according to claim 1, wherein the cement raw meal is a dispersible solid powder.

7. The method according to claim 6, wherein a moisture content in said dispersible solid powder is elevated before being dispersed into the gas stream.

8. The method according to claim 1, wherein the cement raw meal is recollected from the gas stream and used as feed to said preheater.

9. A method for reduction of HCl emission from a gas stream of a cement plant, comprising: dispersing a cement raw meal into said gas stream as an HCL absorber, said cement raw meal being introduced from a raw mill and/or a silo into a pipe with an up going gas flow, said pipe being arranged in fluid communication at a point selected from one of the group consisting of: after a gas conditioning tower; before a particle filter unit; in a by-pass line before a particle filter; a combination thereof; wherein said reduction of HCl emission is applicable when said raw mill is not in operation.

* * * * *